3,431,131
METHOD OF PRODUCING IMAGES
Robert B. Hartman, Bridgeport, Conn., assignor to Remington Arms Company, Inc., Bridgeport, Conn., a corporation of Delaware
No Drawing. Filed Dec. 3, 1965, Ser. No. 511,357
U.S. Cl. 117—.5                    10 Claims
Int. Cl. B41k; B41m 5/00

ABSTRACT OF THE DISCLOSURE

A process for producing images of things such as fingerprints wherein a coalescible film has a coalescible coating upon which the image is imprinted and which is then subjected to heat or pressure to change the cell structure so that appropriate portions will change from an opaque condition to a transparent condition.

---

This invention relates to the production of images of fingerprints, footprints, engravings and other patterned objects on an opaque coalescible film.

Opaque pressure coalescible film is commercially available and is of the type shown in the U.S. patent to Bechtold, No. 2,957,791, patented Oct. 25, 1960, and other patents related thereto. These films are porous, opaque, non-fibrous films of low bulk density composed of partially coalesced discrete particles of a hydrophobic organic addition polymer. Such a film is a composite made up of a transparent film having on one surface an opaque pressure coalescible coating comprising a multitude of minute, interconnecting cells (similar to a sponge). Incident light is so diffused by the myriad cell walls that the coating is for most purposes substantially opaque. Under the application of mechanical pressure, the cell walls may be collapsed into a laminated form which no longer diffuses the incident light and in the impressed areas the coating becomes substantially transparent. It is also known that localized areas of the coalescible coating of such film may be rendered transparent by localized applications of heat sufficient to cause fusion and/or shrinkage of the cell walls or by the localized application of a solvent for the coating which destroys the cellular structure.

It is the principal object of this invention to provide a clean, fast and effective way of recording fingerprints, etc., on such film and developing them in form for instant study by visual examination or enlarged projection.

It has now been discovered that the coating may be rendered transparent by the application of minute quantities of and oily material provided that mild heat is applied for a short time to the treated coating after application of the oily material. The degree of heat and the time of application of heat required is insufficient to render transparent an untreated section of the coating. The oily material may be one which is not itself a solvent for the coating and it is effective if present in such minute quantity that it would not dissolve an appreciable portion of the coating even if it was a solvent.

A useful application of this technique is found in the recording of fingerprints without requiring the usual messy operation of inking the fingers. For example, normally oily skin of the finger tips when pressed firmly on the coated surface of such an opaque pressure coalescible film will leave on the surface of the coating a minute amount of sebaceous oil, tracing the ridges defining the whorls of the fingerprint. Exposure of the entire film to mild heat for a short period of time develops the latent image by rendering transparent only those areas contacted by the sebaceous oil. For example, the treated film was placed, treated side up, on a hot plate at 155° F. for 10 seconds. The fingerprint was clearly reproduced and the background remained opaque. Untreated film may be left on such a hot plate for as much as 5 minutes with only a slight reduction in the opacity of the film. Sebaceous oils, at least in any amount which can be deposited with a fingerprint, can be left on the coated film indefinitely without affecting the transparency of the coating, although visual examination under grazing incident light enables detection of the presence of the oily deposit outlining the fingerprint.

If there is not enough sebaceous oil present on the finger to permit ready reproduction of the fingerprint, the supply of oil may be readily augmented by rubbing the finger alongside the nose, on the hair, or other oily portion of the body, or by the use of other natural animal, vegetable or mineral oils. When other oils are used, excessive oil should not be applied, as sharply defined prints will not be obtained if sufficient oil is present to fill the grooves between the ridges defining the fingerprint. The objective is to transfer oil only from the tops of the ridges defining the fingerprints.

In most hospitals it is routine delivery room practice to footprint newly born babies and sometimes to place the mother's fingerprints on the birth certificate before either mother or baby leave the delivery room. Under such circumstances, the avoidance of the use of messy inks, with the attendant problem of removing such ink from a newly born baby, is an obvious advantage of my process.

Similarly, the reproduction of delicate engravings, half tones, etc., is greatly facilitated by the application of a light film of oil to the surface of the engraving which may then be contacted with the coated surface of the opaque pressure coalescible film and the image developed as in the cases discussed above.

The sensitivity of the process is best illustrated by the fact that I can lift latent fingerprints from other objects by applying the coated surface of the film firmly to the object and then removing the film and developing the image by mild heat. In this way, substantially invisible latent fingerprints have been lifted from the surface of a drinking glass and from the blued surface of a firearm and developed in identifiable form.

There is fairly wide latitude in the choice of methods of applying heat for developing the image. These methods may be as crude as passing the film back and forth over the flame of a match, lighter, or Bunsen burner, and removing the film when the image is developed. Successful development has taken place in a thermostatically controlled oven but substantial difficulty was experienced in achieving uniform development because of poor heat transfer characteristics and unpredictable circulation within the oven. The best results have been obtained by using, as a heater, a thermostatically controlled hot plate, preferably with a black anodized surface which facilitates visual monitoring of the development of the image.

In one series of controlled tests, the relatively dry fingers of one individual were lightly coated with "Noxzema" skin cream to the point where there was no remaining visually apparent evidence of the whiteness of the cream. The finger was then pressed on the coated surface of the opaque pressure coalescible film. The film was then placed on the hot plate with the coated surface up at various hot plate temperatures. The following information was noted:

| Temperature, °F.: | Time for development of fingerprint image |
|---|---|
| 143 | 5½ minutes. |
| 145 | 25 seconds. |
| 150 | 20 seconds. |
| 155 | 10 seconds—background remains opaque. 5 minutes —background begins to lose opacity. |
| 160 | 9 seconds—approx. |
| 165 | 7–8 seconds—approx. |
| 170 | 2–3 seconds—approx. |
| 175 | 2 seconds—approx. |
| 180 | 1 second—approx. |

Maximum and minimum temperatures within this range are determined primarily by operator convenience and work load. Ideally, the heat should be high enough to permit the print to be developed by visual inspection within a reasonable time and low enough so that the film with the developed print can be removed from the hot plate before there is any substantial reduction in the opacity of the background area surrounding the developed fingerprint. Practical temperatures appear to range between about 145° F. and about 180° F., with a preferred range of temperatures limited to between about 155° F. and about 165° F. In this range, the usual development time is 8 to 10 seconds but the film may be left on the hot plate for up to 5 minutes without drastic loss of opacity in the background. To some extent, the time and temperature for development is dependent upon the amount of oil deposited, development occurring faster and/or at lower temperatures with heavier deposits of oil.

Although an image produced in this way is not permanent in the sense that the image may be lost if the film is subjected to high degrees of heat, to solvents or to severe mechanical abuse, the image exhibits sufficient contrast to permit ready reproduction by photographic or xerographic means which will produce a record as permanent as any other documentary record.

An outstanding advantage of this process is found in the fact that the developed film is perfectly dry and may be immediately mounted in a slide holder and optically projected for study and demonstration at any desired degree of magnification.

Although I am not certain of the mechanism by which clarification of the coating is obtained, it is theorized that the oil is absorbed, as by a wick, in the minute interconnecting pores of the coating and thereby improves the heat transfer characteristics of that part of the coating. Such absorption proceeds faster with the application of heat, which renders the oil more fluid. Thus, less heat, and shorter periods of exposure to the heat, is required to produce clarification of the coating than that required to produce an equivalent amount of clarification in an area not exposed to oil. The mechanism of clarification is probably therefore essentially the same as the heat clarification previously noted, and the differential effect which permits the development of the image is the result of localized absorption of an oily heat transfer medium which renders the coating more susceptible to development by heat.

It is not intended that the invention be considered as limited by the attempt made above to explain what takes place in the operation of the process. Instead, it is intended that the invention be limited only by the scope of the claims appended hereto.

I claim:

1. A process of producing images of fingerprints, footprints, engravings and similar patterned objects, on the coalescible coating of an opaque coalescible film, said film being composed of a hydrophobic organic addition polymer and having an open-cell structure characterized by microscopic voids communicating with the surface, said film being capable of sustaining a change in cell structure to provide a clarification of opaqueness, which process comprises the steps of:
   (a) providing on the surface of those areas defining the pattern to be reproduced a thin film of an oily substance;
   (b) transferring at least a part of said oily substance from the areas defining the pattern to be reproduced to the coalescible coating of an opaque coalescible film;
   (c) gently heating all of said coalescible film until those sections thereof to which the oily substance has been transferred are rendered more transparent than the surrounding area to which the oily substance has not been transferred.

2. A process as defined in claim 1, in which said film is heated by placing it on a hot plate heated to a temperature between about 145° F. and about 180° F.

3. A process as defined in claim 2, the temperature of said hot plate being confined to a range between about 155° F. and about 165° F.

4. A process as defined in claim 2, the hot plate being provided with a substantially black surface to facilitate visual observance of changes in the transparency of the coalescible coating.

5. A process as defined in claim 1, said oily substance being transferred from the areas defining the pattern to be reproduced by bringing such areas into contact with the coalescible coating of said film.

6. A process as defined in claim 5, said areas being brought into contact with the coalescible coating with sufficient pressure to insure actual contact but with insufficient pressure to effect a mechanical alteration of the structure of the coalescible coating.

7. A process of reproducing fingerprints and footprints without the use of ink, which comprises the steps of:
   (a) providing on the surface of the ridges defining the print to be reproduced a thin film of an oily substance;
   (b) pressing the print to be reproduced firmly but gently to the coalescible coating of an opaque coalescible film to transfer a part of said oily substance from each of the ridges defining the print to said coating, said film being composed of a hydrophobic organic addition polymer and having an open-cell structure characterized by microscopic voids communicating with the surface, said film being capable of sustaining a change in cell structure to provide a clarification of opaqueness;
   (c) developing the reproduction of said print by exposing all of said film to a source of uniform heat at a temperature and for a period of time sufficient to render those areas to which the oily substance has been transferred more transparent than the surrounding areas.

8. A process as defined in claim 7, in which said film is heated by placing it on a plate heated to a temperature of between about 145° F. and about 180° F.

9. A process as defined in claim 8, the temperature of said heated plate being confined to a range between about 155° F. and about 165° F.

10. A process as defined in claim 7, the natural oils present on the surface of the ridges defining the print to be reproduced being augmented by the application to said surfaces of a light coating of some other oily substance.

References Cited

UNITED STATES PATENTS

| | | | |
|---|---|---|---|
| 2,269,038 | 1/1942 | Perry | 117—36.7 |
| 2,386,148 | 10/1945 | Smith | 117—36.7 |
| 2,739,909 | 3/1956 | Rosenthal | 117—36.7 |
| 2,854,350 | 9/1958 | Phillpotts | 117—36.7 |
| 2,927,039 | 3/1960 | Vander Weel | 117—36.7 |
| 2,957,791 | 10/1960 | Bechtold | 117—36.7 |
| 2,992,128 | 7/1961 | Vonnegut | 117—36.7 |
| 3,109,748 | 11/1963 | Newman | 117—36.7 |
| 3,226,288 | 12/1965 | Smith et al. | 117—36.7 |

MURRAY KATZ, *Primary Examiner.*

U.S. Cl. X.R.

117—36.7